(12) United States Patent
Liu

(10) Patent No.: US 8,078,881 B1
(45) Date of Patent: Dec. 13, 2011

(54) PASSWORD RESETTING METHOD

(76) Inventor: Gary G. Liu, Plano, TX (US)

( * ) Notice: Subject to any disclaimer, the term of this patent is extended or adjusted under 35 U.S.C. 154(b) by 1053 days.

(21) Appl. No.: 10/988,061

(22) Filed: Nov. 12, 2004

(51) Int. Cl.
*G06F 21/00* (2006.01)

(52) U.S. Cl. ..................................... 713/183
(58) Field of Classification Search .................... 713/183
See application file for complete search history.

(56) References Cited

U.S. PATENT DOCUMENTS

| | | | |
|---|---|---|---|
| 5,991,882 A | 11/1999 | O'Connell | |
| 6,652,283 B1 | 11/2003 | Van Schaack et al. | |
| 6,760,752 B1 | 7/2004 | Liu et al. | |
| 7,721,300 B2 * | 5/2010 | Tipton et al. | 719/321 |
| 2003/0182584 A1 | 9/2003 | Barnes et al. | |
| 2004/0117624 A1 * | 6/2004 | Brandt et al. | 713/166 |
| 2004/0230807 A1 * | 11/2004 | Baird et al. | 713/182 |
| 2005/0138399 A1 * | 6/2005 | Cheston et al. | 713/189 |
| 2006/0020798 A1 * | 1/2006 | Lai et al. | 713/170 |
| 2006/0020816 A1 * | 1/2006 | Campbell | 713/182 |
| 2006/0095785 A1 * | 5/2006 | White | 713/184 |

* cited by examiner

*Primary Examiner* — Jason Gee
(74) *Attorney, Agent, or Firm* — Fish & Richardson P.C.

(57) ABSTRACT

A system and method for automatically selecting a procedure for resetting an authentication data, such as a password, a PIN, a secret key, or a private key, according to the value of the user data protected by the authentication data and/or the likelihood for the user to forget or otherwise lose the authentication data. The user's preference is also considered in selecting the procedure for resetting the authentication data.

28 Claims, 3 Drawing Sheets

PASSWORD RESETTING METHOD

BACKGROUND

This invention relates to computer security and a method to optimize password resetting.

Passwords and other type of authentication data are widely used for authentication and access control in many systems. One problem of using passwords for authentication and access control is that people often forget passwords. When a user forgets the password, it needs to be reset so that the user can access the system again. For security reasons, there must be a procedure to authenticate the person who requests password resetting prior to password being reset.

Authentication processes of various security levels have been used in a variety of systems to reset users' passwords. For example, some systems use a "recovery phrase" selected by the user at the account setup to help authenticate the user when the password needs to be reset. The problem with this method is that, if the user can forget the password, he also may forget the recovery phrase which is used less often.

Some systems use a "fact" that the user is unlikely to forget to authenticate the user. For example, Ellen R. O'Connell (U.S. Pat. No. 5,991,882) discloses a method that uses a question and an answer registered at the account setup to authenticate the user when the password needs to be reset. The question and the answer are usually related to a fact that the user is unlikely to forget, such as the user's birth place, mother's maiden name, favorite color, the name of their first pet, etc. Another such example is the key recovery feature of a public/private-key-based secure transmission system disclosed in U.S. Pat. No. 6,760,752. The system hosts every user's public key in a central key server and stores the corresponding private key on the user's computer encrypted using a "Signature Phrase." When the public/private key pair is generated, the user may select a "Recover Question" and provide the corresponding "Recovery Answer." The "Recovery Answer" is then used to encrypt a copy of the private key to be stored on the central key server along with a modified hash of the "Recovery Answer." When a user forgets the "Signature Phrase" or loses the private key, the system will present the "Recovery Question" to the user, and if the user can provide the correct "Recovery Answer", an encrypted "Recovery Package" will be sent to the user to allow the user to recover the private key. During the entire signing up and recovery processes, neither the user's private key nor the "Recovery Answer" needs to be exposed to the central server. The central server only gets an encrypted copy of the private key and a modified hash of the "Recovery Answer." The problem of both of these approaches is that the question and the answer must be related to some facts the user is unlikely to forget. However, such facts are often not a secret known only to the user. In addition, the number of possible answers is usually small, thus allowing brute force attacks (trying every possible answer).

John Banes et al. (U.S. Publication No. 20030182584) discloses a system that uses a "recovery disk" for password resetting/recovery purpose. In such a system, a pair of public and private keys is generated, the private key is stored in a removable device, and the public key is used to encrypt the password. When the user forgets the password, the removable device can be used to get the private key and then the private key can be used to decrypt the password previously encrypted by the public key. The problem with this system is that the user has to keep the recovery disk in a safe place. If the recovery disk is lost, the user will no longer be able to recover or reset the password and another person who gets the recovery disk may be able to obtain the user's password. Further, some recovery disks have a password for access to the private key. This disk access password may also be forgotten by the user.

In some tightly controlled systems, the administrator may require the user to appear in person before the password can be reset. Some systems may require only a telephone call and the operator will ask a few personal questions to authenticate the user before the password can be reset. In some loosely controlled systems, the password can be reset with a plaintext email sent to the user to confirm that the user can receive the message at a specific email address. Some systems even allow the password to be reset arbitrarily but will send an email to alert the user that the password has been reset.

The choice of the password resetting procedure is usually determined by the value of the user data protected by the password, user convenience, and the cost of customer support in the event the user forgets the password. Generally, the more secure the password resetting procedure, the less convenient it is for the users, and the higher the cost of the customer support. For example, a password resetting procedure that requires only a plaintext email confirmation demands very little customer support. A password resetting procedure that requires a user to appear in person or verification of user's personal information over the phone will incur considerable cost in customer support. A password resetting procedure that requires the users to select a "recovery phrase" or "fact" will add an extra step at the account setup. And because the user may also forget the "recovery phrase" or "fact" the cost of customer support cannot be avoided.

Many systems offering free services on the Internet use password resetting procedures of minimal security in order to reduce the cost of customer support to the minimum. This usually results in a very questionable security level.

One such example is a typical web based secure email service. Such a service allows a user to pick up a secure message from a message center using a browser over an SSL connection by entering a password. In order to reduce the cost of customer support, an extremely loose password resetting procedure is usually chosen. The password can be changed by clicking a "change password" link and responding to a confirmation email message. The problem of such a service is that the password resetting procedure actually allows anyone who has access to the user's plaintext email messages to reset the password and gain access to messages stored in the message center. Therefore, the security level offered by such a service is equivalent to plaintext email, except that the user will notice that the password has been changed if the user account has been attacked.

Most of the existing systems use a fixed password resetting procedure for everyone, do not give the user a choice for using different password resetting procedures according to the user's security requirements, and do not allow the choice to be altered when the user's security requirements and the likelihood of forgetting the password changes. The problem is that the value of the user data and the likelihood of the user forgetting passwords are not equal for different users and can change over time even for the same user. Take the example of a web-based secure email system with automatic message expiration. Some users of the system seldom receive secure messages, so often the messages have expired and have been purged. There is very little value in the user account. This type of user is also more likely to forget their passwords. On the other hand, there may be users who use the secure email system routinely and have many messages stored there. These users are very unlikely to forget their passwords. When a user first signs up for a secure email account, he/she probably just wants to give it a try to determine whether it is useful to them. At this time, the value of the account is usually low and the user is very likely to forget the password. However, as the user starts to use the account seriously and frequently, the value of the user data in the account will increase and the likelihood of the user forgetting the password will decrease.

Another example is an online stock trading or online banking account. A user with an account balance of $10,000,000 might require a more secure password resetting method than a user with $8,000 in the online account. In addition to the value, there is also a difference in the likelihood for different users to forget the password. A stock trader who trades frequently online is very unlikely to forget the password of his/her online trading account.

It is clear that a-fixed password resetting procedure does not offer an optimized choice of a password resetting method to balance security requirements, user convenience, and the cost of customer support. There is a need for a system and method that can optimize the choice of password resetting procedure to maximize the security while minimizing the customer support and user inconveniences.

SUMMARY

In one aspect, the invention provides a system and method for controlling access to user data. Authentication data for controlling access to user data is stored. A procedure for resetting the authentication data is selected. The selection can consider a value of the user data, a likelihood of a user losing the authentication data and a user's preference.

Features of the invention can include automatically selecting a procedure for resetting a user's authentication data, such as a password, a personal identification number (PIN), a secret key, a pubic/private key pair, according to the value of the user data protected by the authentication data and/or the likelihood of the user forgetting, or otherwise losing, the authentication data. More specifically, the system may implement a set of procedures having different security levels for resetting the user's authentication data. The system may automatically choose a resetting procedure that offers a lower security level but provides more convenience and requires less customer support when the value of the user data is low and the user is likely to forget the authentication data. For example, when the user has just signed up for a secure email account protected by a password and has not used it frequently. However, when the user starts to use the account more frequently or the value of the user data increases, the likelihood of the user forgetting the password decreases. The system may automatically choose a password resetting procedure that provides more security but less convenience and may require more customer support. The user and/or the administrator, however, can override the automatic selection and select a password procedure according to their own preferences or criteria.

For a monetary transaction system, such as an online banking, stock trading, online payment, etc., the value of the user data can be estimated according to the balance available and/or the size of transactions allowed when the user is authenticated using the authentication data.

For a secure messaging system, the value of the user data can be estimated according to the number of messages, and/or the size of messages, and/or the sensitivity of messages, made, available to the user once the user is authenticated using the authentication data.

The likelihood for the user to lose the authentication data can be simply estimated according to how many times the user has successfully used the authentication data. More sophisticated models based on forgetting curves of human memory can also be used.

Usage statistics accumulated during the operation of the system can be used to measure or improve the parameters of the forgetting curves. For this reason, the longer the system operates, the more accurately the likelihood for a user to lose the authentication data can be estimated.

For certain public/private key based secure messaging system, both the value of user data and the likelihood for the user to lose the authentication data can be estimated according to the number of times the user's public key is retrieved from a central key server.

One possible advantage of this system is that the system can optimize the choice of an authentication data resetting procedure to maximize security while minimizing the cost of customer support and user inconveniences. Such optimization may increase security and lower the cost in many systems. For a tightly controlled password-based system, the cost of customer support can be significantly reduced because casual users who are very likely to forget their passwords will use a password resetting procedure that is less secure and needs very little support. For a loosely controlled password-based to system, the security level can be significantly increased for serious users who frequently use the system and are very unlikely to forget their passwords or because the value of the user data in the account is determined to be of sufficient value to associate the account with a more secure password resetting procedure.

The system also allows a user to optionally select an authentication data resetting procedure according to the user's security requirements and preferences. The selection does not have to be fixed at the account setup and may be changed any time as the user's security requirements and preferences evolve over time.

These and other advantages will be apparent upon a review of the specification, the drawings, and the attached claims.

DETAILED DESCRIPTION

Figure 1:
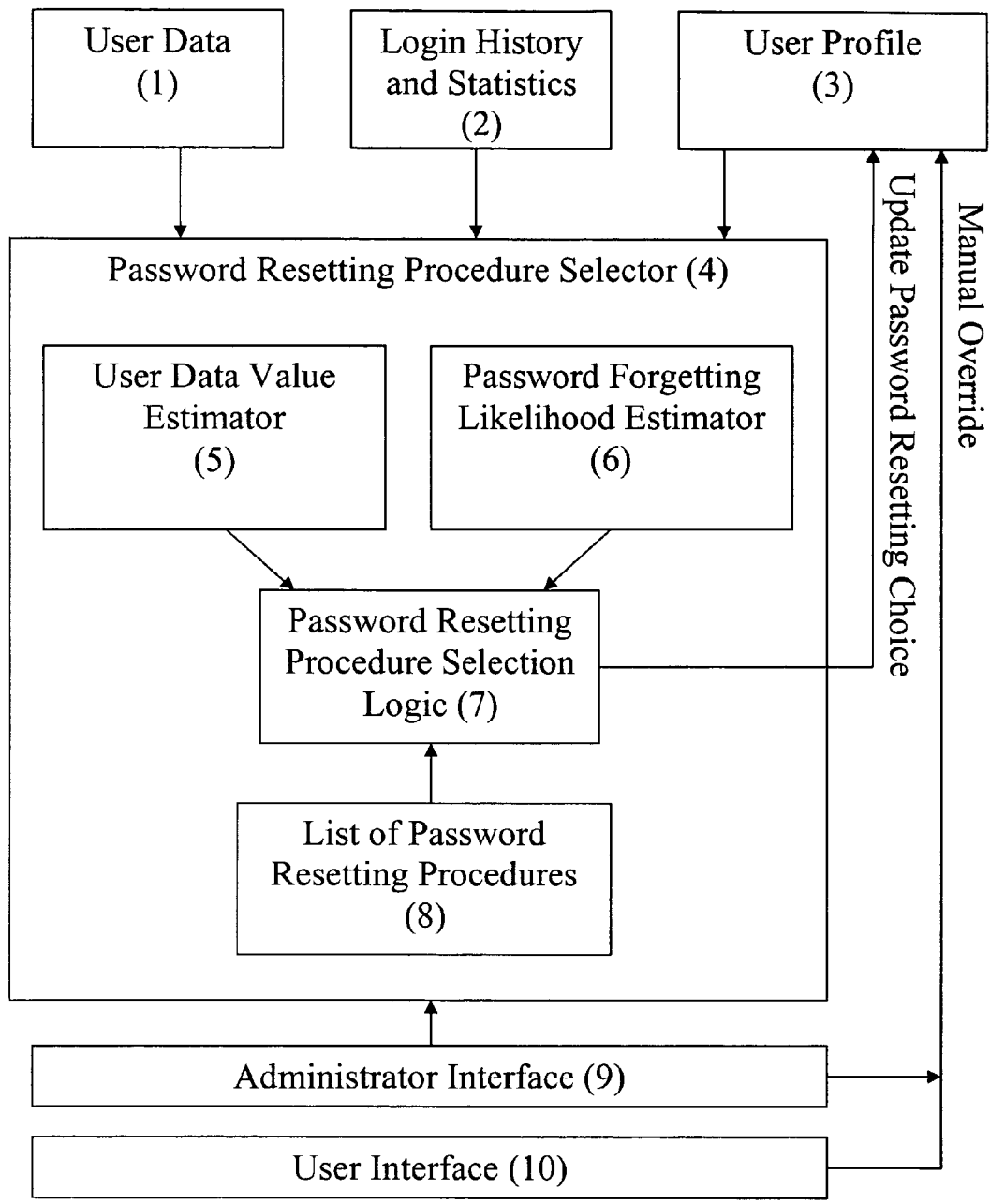
FIG. 1 shows the block diagram of a system for automatic selection of a password resetting procedure according to the value of the user data and the likelihood of the user forgetting the password.

A system and method for automatically selecting a procedure for resetting authentication data according to the value of the user data protected by the authentication data and the likelihood for the user to lose the authentication data is described. The method can be implemented as part of any system that uses any type of authentication data for authentication or access control. For example, the type of system can be a computer system, a network system, an online banking system, an online transaction system, an online ordering system, an online magazine subscription system, an online stock trading system, an email system, a web based secure email system, a public/private-key-based secure messaging system, etc. The type of authentication data can include a password, a pass phrase, a personal identification number (PIN), a secret key, a symmetric key, a pair of public/private keys, a digital certificate, or an authentication "token".

The user can lose the authentication data in many different ways. The most common way to lose the authentication data is to forget the data, for example, a user may forget a password of a login account. However, in some systems, the authentication data may be a "strong secret" that is too large for a human to remember, such as a 128-bit symmetric key or an 1024-bit private key. In such systems, the authentication data can still be effectively "forgotten" when the user forgets the password protecting the authentication data, forgets where the authentication data is stored, or forgets which authentication data corresponds to which account in which system. In addition, the authentication data can be physically lost due to events, such as a disk crash.

The authentication data can be reset in many different ways depending on the type of authentication data and the type of system, including resetting the system to use a default password, recovering a lost password, allowing the user to enter a new password, generating a new password and sending the new password to the user, generating a new PIN, generating a new symmetric key, recovering a lost private key, generating a new pair of public and private keys, issuing a new digital certificate to replace an old certificate, resetting a public key in a central key server to allow the user to generate a new pair of public/private keys (for example, for a system described in U.S. Pat. No. 6,760,752).

The current invention can be implemented in different forms depending on the type of system, the type of authentication data, the way a user may lose the authentication data and the manner the authentication data can be reset. However, for descriptive clarity, the terminology of a typical password-based authentication or access control system will be used for describing the details of this invention. The use of this specific terminology should not be construed to limit the scope of the invention. For example, the term "password" is not limited to a word, it refers to any type of authentication data used for authentication and/or access control purposes, including but not limited to, a pass code, a pass phrase, a personal identification number (PIN), a secret key, a symmetric key, a pair of public/private keys, a digital certificate or an authentication "token", etc. Similarly, the term "forget password" refers to any manner the user may lose the authentication data, including but not limited to, forgetting the authentication data, forgetting a secret protecting the authentication data, forgetting where the authentication data is stored, forgetting a secret or a "fact" required for recovering the authentication data forgetting how to recover the authentication data, forgetting which authentication data is for which account in which system, physically losing the authentication data or physically losing a secret protecting the authentication data, etc. The term "password resetting" refers to any method to re-establish the authentication data, including but not limited to, resetting the system to use a default password, recovering the lost password, allowing the user to enter a new password, generating a new password and sending it to the user, generating a new PIN, generating a new symmetric key, recovering the lost private key, recovering the authentication data using a secret sharing scheme, generating a new pair of public and private keys, issuing a new digital certificate to replace an old certificate or resetting a public key in a central key server to allow the user to generate a new pair of public/private keys.

Referring now to FIG. 1, a system for automatic selection of a password resetting procedure is shown. The system includes a Password Resetting Procedure Selector (4) which automatically selects a password resetting procedure for a particular user according to the User Data (1), the Login History and Statistics (2) and the User Profile (3). An Administrator Interface (9) is also included to allow the administrator to manually select the password resetting procedure for any user and to change various parameters in the Password Resetting Procedure Selector (4). A User Interface (10) is also available for the user to override the automatic selection and manually select the password resetting procedure according his/her security requirement or preference.

The User Data (1) can include any data that can be used to estimate the value of the user data. For example, for a monetary account, the data can include the amount of money in a user account, the amount the user is authorized to withdraw using the password, and the transaction history. It can also include statistics accumulated for the user account, such as the highest, lowest and average balances in last six months, average size of transactions, etc. For a secure email account, the User Data (1) can include all the messages currently stored in the user account or some current and historical statistics, such as the number of current messages, the total size of all the current messages, the average number and total size of messages stored in the account for last 60 days or the number of message received each day for the last 60 days.

The Login History and Statistics (2) can include data that can be used to estimate the likelihood for the user to forget the password. It can simply include the number of successful and failed logins since the password was established or a complete record of user's login history, including the time and success or failure for each login since the password was established. A partial record, instead of a complete history, may be used to reduce the storage requirement or to reflect only the most recent activities. For example, the record may contain only the login history of past three months. A simple system may only record the time since last successful login or the time of a few last successful logins. Simple statistics can be used instead of, or in addition to, the login history. For example, the number of successful logins since the password was established can be used, or the number of successful logins in the past 10 days. The statistics can also include the number of times the user has changed the password, the number of times the user has requested password resetting, etc.

The User Profile (3) is a profile containing data associated with the user account, including at least a user name and associated password data. In addition the User Profile (3) includes a "Password Resetting Choice" parameter to indicate which password resetting procedure will be used in case the user forgets the password. The User Profile (3) may also include a user type or other useful information. Different type of users may have a different likelihood to forget the password. For example, casual or trial users may be more likely to forget the password while users who actually pay for the service or use the service frequently are less likely to forget the password. The User Profile (3) can also contain a flag to indicate whether automatic selection of a password resetting procedure is allowed. Using the User Interface (10), the user may set the flag to enable or disable automatic selection and to manually select the password resetting procedure according the user's security requirements and preferences.

As shown in FIG. 1, Password Resetting Procedure Selector (4) generally includes a User Data Value Estimator (5), a Password Forgetting Likelihood Estimator (6), a Password Resetting Procedure Selection Logic (7) and a List of Password Resetting Procedures (8). For a simple system, if the user data value is not important or is difficult to estimate, the password resetting procedure may be selected solely based upon the likelihood of the user forgetting the password. In this case, the system does not have to include the User Data Value Estimator (5). Alternatively, a simple system can select the password resetting procedure solely based on the user data value. In this case, the system does not have to include the Password Forgetting Likelihood Estimator (6).

The User Data Value Estimator (5) includes a method or algorithm to estimate the value of user data protected by the password. It will be different depending upon the type of the system, but the result will typically be a number called "Value Score", denoted by the letter V. For example, for an online banking account, V can simply be a number that is proportional to the account balance and/or the amount the user is authorized to withdraw or transfer per day using the password. A simple model can be represented by the following equation.

$$V=a(\text{account balance})+b(\text{amount allowed to withdraw per day})$$

a and b are two constants that determine the relative importance of the account balance and the amount allowed to be withdrawn per day in evaluating the user data value. For a model that estimates the user data value solely based on the account balance, b can be 0. For a model that estimates the user data value solely based on the amount allowed to be withdrawn, a can be 0. More sophisticated user data value models can be developed that take into account the transaction frequency and average size of transactions, ratios of transaction sizes to balances, etc. For a secure email account, the Value Score V can simply be a value that is proportional to the average number of messages stored in the user account, the number of messages actually retrieved, or the average total size of the messages stored in the account. More sophisticated models can be developed that do not treat messages to be the same. Sensitive messages can be weighted more and SPAM messages can be ignored. For example, a content scanner can be used to scan the messages to determine the sensitivity of the message. A message that contains certain key words or a pattern of a credit card number or social security number can be considered more sensitive and be counted as 10 messages. A message that has been determined to be a spam by a spam filter can be ignored or counted as 0. Spam can even be counted as negative. For example, a spam message can be counted as −0.01 messages. This means that an email account containing 99% spam and 1% of non-spam messages has no value. In such a model, V can be evaluated as:

$$V=(\text{num. ordinary messages})+10(\text{num. of sensitive messages})-0.01 \text{ spam}$$

More sophisticated models can be developed so that V also depends on how frequently the user accesses the account. The user type can also be taken into account. For example, the V value of a trial user may be discounted by 50% compared to a paying user.

The number of messages can be counted indirectly in some public/private-key-based systems. For example, in the system disclosed in U.S. Pat. No. 6,760,752, the recipient's public key is retrieved from a central key server every time a message is to be sent to the recipient. For this reason, the number of messages the recipient receives is directly related to the number of times the user's public key is retrieved from the central key server as a recipient's key. In such a system, the central server can estimate the value of the user data by counting the number of times the user's public key is retrieved as a recipient's key within certain time period.

Password Forgetting Likelihood Estimator (6) includes a method or algorithm to estimate the likelihood that the user will forget the password. The output of the Password Forgetting Likelihood Estimator (6) is a number L, representing a relative likelihood. The likelihood can be estimated and represented in many ways. The absolute scale of L is not important; as long as L represents some relative likelihood of the user forgetting the password. One way to estimate L is to use the "forgetting curves" of human memory.

Figure 3:
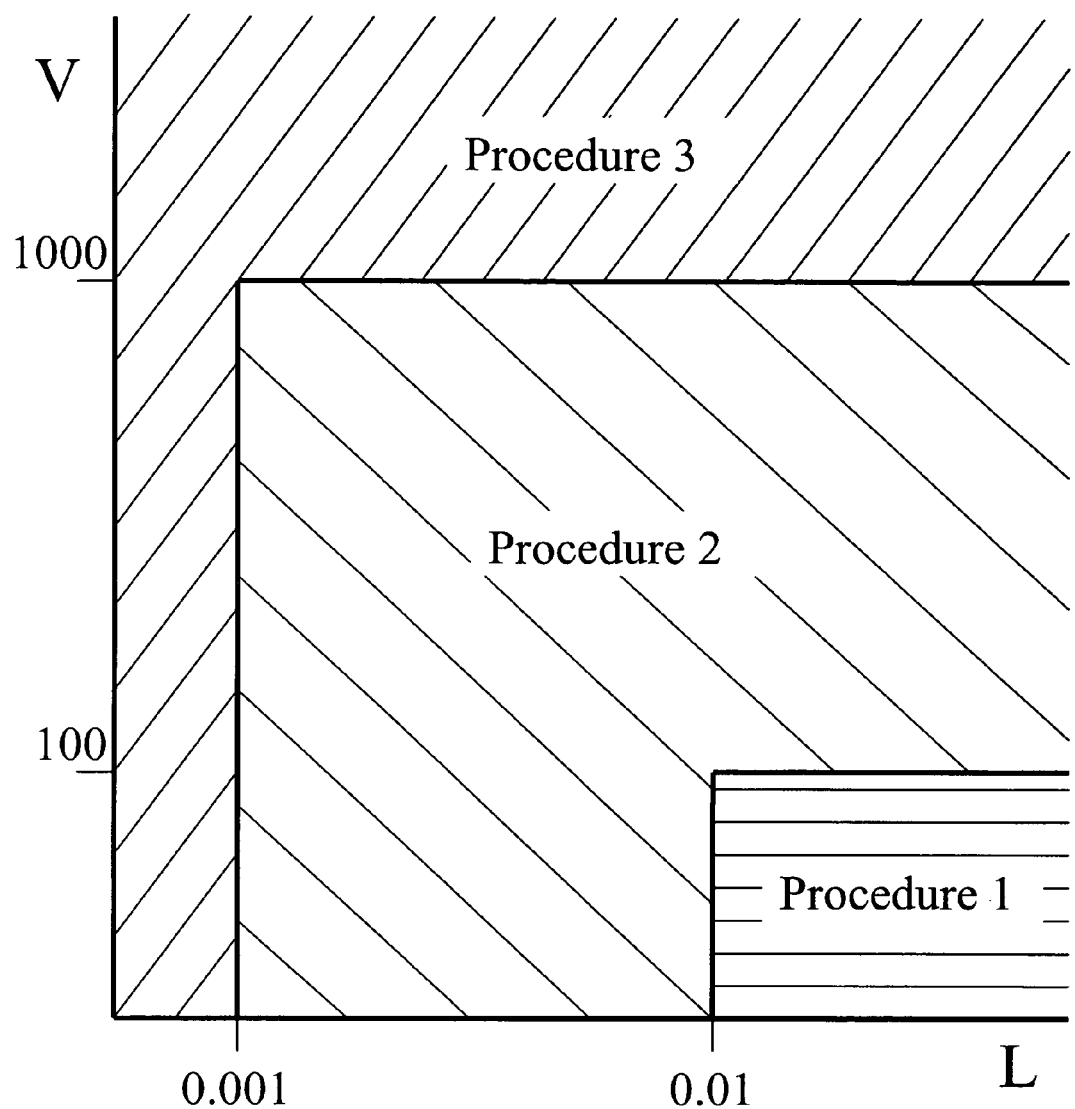
FIG. 3 is an example of areas on the L versus V plane covered by each password resetting procedure.

Human memory decays with time. A "forgetting curve", which represents the fraction of memory retained as a function of time, is shown in FIG. 3 of U.S. Pat. No. 6,652,283 by Van Schaack, et al. The forgetting curve can be approximately represented by an exponential function.

$$R=e^{-\alpha t}$$

R is the fraction of the memory retained, t is the time since the memory is established or refreshed, α is the decay rate. Repetition allows the memory to decay more slowly. Therefore, α is generally a function of the number of previous repetitions.

$$R=e^{-\alpha(n)t}$$

n is number of previous repetitions.

Using such a simple memory model, the likelihood a user forgets the password can be represented by:

$$L=1-e^{-\alpha(n)t}$$

where n is the number of times the user has successfully logged in using the same password and t is the time since the last successful login. If the user has established the password but has not logged in yet, n should be 0 and t should be the time since the password was established. Experience has shown that repetitions within very short time have little effect to enhance long term memory. For example, if a user has established a password and then logged in 10 times in the same day, he may still forget the password one week later. For this reason, repetitions within a short time period may be ignored. For example, all successful logins within one day may be counted as only one login. Such a way of counting repetitions also automatically ignores logins using cached password if the time limit for a password to be cached is less than one day. Obviously, logins using cached password do not enhance the memory.

The problem now is how to determine α(n). α(n), in fact, is the rate for a user having had n repetitions to forget the password, and therefore, can be measured according to the fraction of users requesting password reset within a certain time period out of total number of users having had the same number of repetitions. For example, if a system has total of 10,000 users who have successfully logged in three times and 45 of them have requested password reset within 30 days, then:

$$\alpha(3)=45/(10{,}000\times30 \text{ day})=1.5\times10^{-4} \text{ per day}$$

By accumulating statistics on user password resetting requests and number of successful logins, α(n) can be measured. The longer the system is running and the more users the system has, the more accurately α(n) can be measured.

While the above describes a fairly sophisticated model to estimate L, many simplifications are possible. First, the number of users forgetting the password is usually small compared to the total number of users. Therefore, α(n)t is usually a small number.

$$L=1-e^{-\alpha(n)t}$$

can be approximately written as:

$$L=\alpha(n)t$$

Because the absolute scale of L is not important, we can simply write:

$L=t$; for $n=0$, and $L=t/r_n$; for $n>0$ where $r_n$ is a "repetition factor" representing how much the likelihood of forgetting the password can be reduced if the password has been used n times. $r_n$ is related to $\alpha(n)$ by:

$r_n=\alpha(0)/\alpha(n)$ and can be measured as described above.

More simplifications are possible. On one extreme, the effect of repetition can be ignored, so $L=t$ can be used regardless of how many times the user has successfully logged in using the same password. On the other extreme, the likelihood of forgetting the password may be estimated solely on the number of repetitions. For example:

$L=50-n$ can be used. This model is crude, but still indicates that the likelihood of forgetting a password decreases as the number of repetition increases, and if the password has been repeated 50 times, L will be 0 indicating that the user will never forget the password.

It is also possible to construct more complex and sophisticated models to estimate L. For example, in the above discussions, only the number of repetitions is taken into account. The memory decay rate however, may not only depend upon the number of repetitions, but also depend upon the timing of each repetition. More sophisticated models can be developed to take into account such an effect. Information in User Profile (3) may also be taken into account in estimating L, such as the user type, user's age, user's profession, etc. User Data (1) may also be useful in estimating L. For example, a content scan of the messages in a user account may indicate whether the user is using the account seriously, and this may be useful in estimating the likelihood of the user forgetting the password. Complex models may be developed to take all these effects into account.

Note that all formulas for V and L are representative and are not meant to limit the invention in any manner. Virtually any formulas or criteria may be considered within the framework of the invention, as long as V and L represent the value of user data and the likelihood for the user to lose the authentication data. For example, the decay of human memory is not the only cause for a user to lose the authentication data. If the loss of the authentication data is not mainly caused by the decay of human memory, the forgetting curves may not apply, and L can be obtained using entirely different formulas.

A system implemented according to the current invention can start with a simple model to estimate the likelihood of forgetting the password. As more experience and statistics are accumulated, more sophisticated models can be used and $\alpha(n)$s or other parameters can be measured more accurately and the system can be optimized.

List of Password Resetting Procedures (8) contains a list of password resetting procedures that are available in the system. Each password resetting procedure specifies the procedure to be followed and authentications required for resetting the user's password. For example, a simple system can have two choices of password reset procedures:

Procedure 1—Password Reset with Email Confirmation
When the user requests a password reset, the system sends a confirmation email to the user's email address. Only when the user clicks the "accept" link in the confirmation email, the password is actually reset.

Procedure 2—Password Reset Requiring a Telephone Call
The user calls the customer support to reset the password. The customer support verifies personal information to authenticate the user before resetting the password. In one implementation the user is required to call from a specific phone number (determined by the "Caller-ID").

More choices can be added using the Administrator Interface (9) when appropriate. For example, after the simple system has been running for a while, the value of the user data in some user accounts can become high enough to require a more secure password resetting procedure. In this case, a more secure password resetting procedure may be added:

Procedure 3—Password Reset Requiring Personal Appearance
The user appears in person with a photo ID or sends in a notarized letter in order to reset the password.

The following are additional examples of password resetting procedures having different security and requiring different levels of customer support that can be included in List of Password Resetting Procedures (8):

Arbitrary Password Reset:
The password can be reset arbitrarily without any restriction. This is the loosest possible password resetting procedure and can be used for trial users.

Arbitrary Password Reset with Notification:
The password can be reset arbitrarily. The system notifies the user using a known email address after the password is reset.

Password Reset with Three Email Confirmations
When the user requests a password reset, the system sends one confirmation email to the user's email address each day for three days. Only when the user has clicked the "accept" link in all the three confirmation emails, is the password actually reset.

Password Reset Requiring a Digital Signature
The user sends in a digitally signed message to reset the password. The digital signature is verifiable using the user's digital certificate bearing the user's identity. The certificate can be previously registered or sent in along with the signed message.

Password Reset Requiring a Telephone Call and Mailing Address Confirmation
The user calls the customer support to reset the password. The customer support verifies some personal information to authenticate the user and then sends the new password to the user's mailing address. This procedure can include "Caller-ID" verification as well.

Password Reset Requiring Biometrics Authentication
The password can be reset when the person requesting the reset is authenticated using biometrics data, such as a finger print or an iris scan.

Password Reset Not Allowed
The password cannot be reset. In some systems, this means that the user account can never be used again if the user forgets the password. In some systems, however, this does not necessarily mean that the password can never be reset. For example, in a secure email account, if the user has not successfully accessed the account for 60 days, the account may be locked to prevent more messages to be received. Then, after an additional 30 days, all the messages received are purged. The value of the account is much less than before. This causes a different password resetting procedure to be selected, which can allow the user to reset the password.

Password Resetting Procedure Selection Logic (7) is a set of logical conditions that determine which password resetting procedure in the List of Password Resetting Procedures (8) can be used according to the user data value "V" and the likelihood the user forges the password "L". The choice is written into the User Profile (3) to update the "Password Resetting Choice" parameter. The logical conditions generally define an area in the L versus V plane for each of the choices of the password resetting procedures listed in the List of Password Resetting Procedures (8). For example, Procedure 1: if V<100 AND L>0.01
Procedure 3: if V>1000 OR L<0.001
Procedure 2: default (other values of V and L)

represent a possible set of logical conditions. This set of conditions indicates that to Password Resetting Procedure 1 will be chosen if V is less than 100 and L is greater than 0.01, Password Resetting Procedure 3 will be chosen if V is greater than 1000 or L is less than 0.001, and for other L and V values, Password Resetting Procedure 2 will be chosen. The areas on the L versus V plane covered by each Password Resetting Procedure are shown in FIG. 3.

The areas on the L versus V plane do not have to be defined using vertical and horizontal lines, as shown in FIG. 3. For example, complex areas can be defined using logical conditions such as aV-bL<c, where a, b, and c are some constants, or more generally F(V,L)<c, where F(V,L) represents any function of L and V. Lookup tables can also be used to define areas on the L versus V plane.

More than one password resetting procedures can be associated with a defined area in the L versus V plane. In such a case, the user may be asked to choose one of several possible password resetting procedures according to his/her preference.

In a simple system where the password resetting procedure is selected solely based on the user data value, the system does not have to include the Password Forgetting Likelihood Estimator (6) and the set of logical conditions only need to consider the value of V. Alternatively, in a system where the password resetting procedure is selected solely based on the likelihood of the user forgetting the password, the system does not have to include the User Data Value Estimator (5) and the set of logical conditions only needs to consider the value of L.

In one implementation, a single variable is used to estimate both L and V. The system can be simplified so that the logical conditions can be directly written for that single variable without separately evaluation L and V. In the system disclosed in U.S. Pat. No. 6,760,752, the sender's and recipient's public keys are retrieved from a central key server every time a message is to be sent. As discussed earlier, the number of times a user's public key is retrieved is directly related to the number of encrypted messages the user receives, and therefore, can be used to estimate V. However, the number of times the user's public key is retrieved can also be used to estimate L, because the user needs to have access to the private key in order to decrypt an encrypted message. Although there is no guarantee that every message received will be decrypted, it is reasonable to assume that if a user has been receiving encrypted messages for a period of time without requesting a private key recovery, he/she is able to get the private key to decrypt the messages. For such a system, the User Data Value Estimator (5) and the Likelihood Estimator (6) are not necessary, and the logical conditions for selecting a resetting procedure can be directly written for a single variable $N_R$ representing the number of times a user's public key is retrieved as a recipient's key within certain time period. For example:

Procedure 1: if $N_R$ is less than 5 times per month
Procedure 2: if $N_R$ is greater or equal to 5 times per month If the user's key is retrieved as a sender's key, it is a stronger indication that the user has not forgotten the signature phrase or lost the private key, because the user must use the private key to sign the message before encrypting and sending the message. For this reason, the set of logical conditions may be written as:

Procedure 1: if $aN_R+bN_S$ is less than c
Procedure 2: if $aN_R+bN_S$ is greater or equal to c where $N_s$ is the number of times the user's key is retrieved as a sender's key, and a, b, c are constants that can be determined by experience and fine tuning.

Note that the above methods for selecting a password resetting procedure according to the value of the user data and the likelihood of the user forgetting the password are representative and are not meant to be limiting. Virtually any method or criteria to select a password resetting procedure can be considered within the framework of the methods described herein.

The Administrator Interface (9) can be used to update various aspects of the Password Resetting Procedure Selector (4), including loading, removing, and choosing various algorithms and parameters used in the User Data Value Estimator (5) and the Password Forgetting Likelihood Estimator (6), setting up logical conditions and formulas in the Password Resetting Procedure Selection Logic (7), and adding and deleting items in the List of Password Resetting Procedures (8). The choice of the algorithms, formulas and parameters can apply globally (same for every user), be specific to each user group, or be specific to an individual user. The Administrator Interface (9) can also be used to manually select a password resetting procedure for any user overriding the automatic setting of the Password Resetting Procedure Selector (4).

The User Interface (10) can be used to set and modify various data and flags in the User Profile (3). It can also be used to manually select the password resetting procedure overriding the automatic selection made by the Password Resetting Procedure Selector (4). The User Interface (10) can be an independent user interface or it can be part of a larger user interface of the system.

Figure 2:
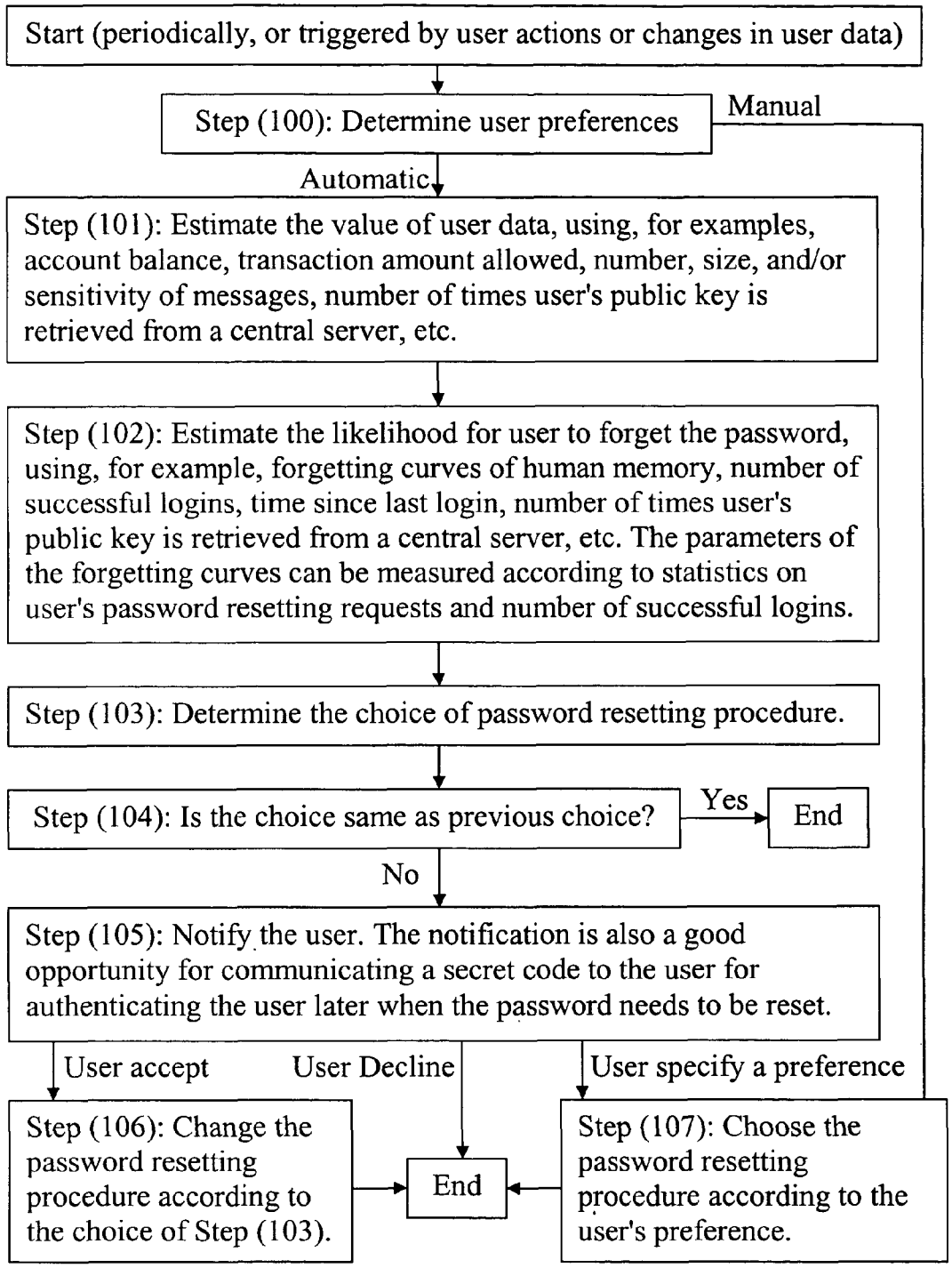
FIG. 2 shows the process of automaticly selecting a password resetting procedure according to the value of the user data and the likelihood of the user forgetting the password.

FIG. 2 shows the process for selecting the password resetting procedure according to the value of user data, and/or the likelihood of the user forgetting the password, and/or the user's preference. The process can be started periodically or triggered by user login or other activities or changes in the user data. Once started, the process goes to Step (100).

At Step (100), the process determines whether the automatic selection of password resetting procedure is enabled. If so, the process goes to Step (101). Otherwise, the process jumps to Step (107) to select the password resetting procedure according to the user's preference.

At Step (101), the process estimates the value of the user data in the user account. In one embodiment, the value of the user data can be estimated base on an available balance, amount of allowed transactions, the number, size, and sensitivity of the messages in the user account, the number of public key retrievals, etc., as described previously regarding the Data Value Estimator (5) of FIG. 1. For a system that selects the password resetting procedure solely based on the likelihood of user forgetting the password, Step (101) can be ignored.

At Step (102), the process estimates the likelihood of the user forgetting the password. In one embodiment, the likelihood of the user forgetting the password can be estimated using the forgetting curves of human memory, the number of successful logins, the time since last login, the number of times user's public key is retrieved from a central server, etc., as described previously regarding the Password Forgetting Likelihood Estimator (6) of FIG. 1. For a system that selects the password resetting procedure solely based on the value of user data, Step (102) can be ignored.

At Step (103), the process determines the choice of password resetting procedure according to the value of user data estimated in Step (101) and the likelihood of the user forgetting the password estimated in Step (102). The determination can be made in various ways. Some of the ways to determine the choice of password resetting procedure have been described previously in the detailed descriptions regarding the Password Resetting Procedure Selection Logic (7) of FIG. 1.

At Step (104), the process determines whether the choice determined at Step (103) is different from the previous choice. If so, the process optionally goes to Step (105). Otherwise, the process ends.

At Step (105), the process can optionally notify the user that the password resetting procedure is being changed. In one implementation, the user is given a chance to accept or decline the change. In such implementation, if the user accepts the change, the process goes on to Step (106). If the user declines the change, the process ends. In an alternative implementation, the process simply gives the user a notification and proceeds to Step (106) without giving user a chance to decline. In one implementation, the user is able to undo the change or make a different change by modifying the appropriate settings in the user profile. The notification can be sent to the user in a variety of ways, including a popup message after or before the user logs in, or an email message sent to the user's email address. In one implementation, the user is given more choices than simply accepting or declining the change determined at Step (104). For example, the user can be presented with several password resetting procedures to choose from. These password resetting procedures can be part or all of the choices listed in the List of Password Resetting Procedures (8) of FIG. 1. If the user chooses a password resetting procedure, the process goes to Step (107) to set the password resetting procedure according to the user preference.

The notification message sent or shown to the user at Step (105) is also an opportunity to communicate a secret that can be used to authenticate the user later when the password needs to be reset. An example of such notification message is the following:

"You have successfully logged in using your password at least 10 times. We believe it is unlikely that you will forget your password in the future. In order to strengthen the security of your account, your password can no longer be reset by clicking the "forgot password" link and answering a confirmation email. If you do forget your password in the future, you need to call the customer service to reset your password. In addition, you need to mention the Password Reset Code: P1A57D to the customer service to reset your password. Please write down this code and store it in a safe place."

Alternatively, instead of telling the user a secret "Password Reset Code" in the notification message, the message may ask the user to enter a "Recovery Phrase" to be used for authentication purpose later when the password needs to be reset.

At Step (106), the process changes the password resetting procedure for the user according to the choice determined at Step (103).

At Step (107), the process sets the password resetting procedure according to the user's preferences.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

A programmable processing system (system) is suitable for implementing or performing the apparatus or methods of the invention. The system can include a processor, a random access memory (RAM), a program memory (for example, a writable read-only memory (ROM) such as a flash ROM), a hard drive controller, a video controller, and an input/output (I/O) controller coupled by a processor (CPU) bus. The system can be preprogrammed, in ROM, for example, or it can be programmed (and reprogrammed) by loading a program from another source (for example, from a floppy disk, a CD-ROM, or another computer).

The hard drive controller is coupled to a hard disk suitable for storing executable computer programs, including programs embodying the present invention, and data.

The video controller is coupled to a video recorder, which can be used for storing and importing video footage and for writing final output.

The I/O controller is coupled by means of an I/O bus to an I/O interface. The I/O interface receives and transmits data (e.g., stills, pictures, movies, and animations for importing into a composition) in analog or digital form over communication links such as a serial link, local area network, wireless link, and parallel link.

Also coupled to the I/O bus is a display and a keyboard. Alternatively, separate connections (separate buses) can be used for the I/O interface, display and keyboard.

Part or all of the functional operations described in this specification can also be executed by one or more human operators while the remaining part of the functional operations can be carried out by electronic or mechanical devices described above.

While this invention has been described in terms of several preferred implementations, it is contemplated that alterations, modifications and permutations will become apparent to those skilled in the art upon a reading of the specification and studying the drawings. For example, many simplifications to the system are possible. Although some simplified systems many lose some of the benefits discussed above, they still offer significant improvements over the prior art systems that use fixed password resetting procedure for all users. For example, the system can be implemented to determine the choice of password resetting procedure solely based on the value of the user data. The system can also be implemented to determine the choice of password resetting procedure solely based on the likelihood of the user forgetting the password. Furthermore, the system can be implemented so that the choice of password resetting procedure is solely determined by the user preference. In such a simplified system, the user can be reminded that there are several password resetting procedures available and they should choose the appropriate one according to their security requirements and preference. Such reminders can be given periodically or can be triggered by changes in user data or usage statistics. The reminders may or may not include a suggested choice based on the value of the user data and/or the likelihood for the user to forget the password.

Furthermore, certain terminology has been used above for the purposes of descriptive clarity, and should not be construed to limit the above described methods or techniques. It is therefore intended that the following appended claims include all such alterations, modifications and permutations as fall within the true spirit and scope of the description presented herein.

I claim:

1. A system for controlling access to user data, comprising:
   authentication data for controlling a user's access to user data; and
   a selector for automatically selecting a procedure from a set of at least two procedures for resetting the authentication data,
   where at least one of a value of the user data or a probability of the user losing the authentication data is considered in selecting the procedure;
   where the selected procedure is activated to reset the authentication data when the authentication data is lost or the user requests a reset of the authentication data;
   where the selector automatically selects a new procedure different from the selected procedure from the set upon determining a change in the value of the user data or a change in the probability of the user losing the authentication data based on one or more predetermined criteria.

2. The system of claim 1, wherein the authentication data includes a password.

3. The system of claim 1, wherein the authentication data includes a secret key.

4. The system of claim 1, wherein the authentication data includes a pair of public and private keys.

5. The system of claim 4, wherein the value of the user data or the probability of the user losing the authentication data is estimated, including considering a frequency or a number of times the public key is legitimately retrieved from a central server.

6. The system of claim 1, wherein the value of the user data is estimated, including considering a monetary value or a size of a transaction allowed when the user is authenticated using the authentication data.

7. The system of claim 1, wherein the value of the user data is estimated, including considering a number of messages, a size of messages or the sensitivity of messages made available to the user once the user is authenticated using the authentication data.

8. The system of claim 1, wherein the probability of the user losing the authentication data is estimated based on a mathematical model describing decay of human memory with respect to time.

9. The system of claim 8, wherein the mathematical model includes parameters derived from statistical data,
   wherein the statistical data includes data accumulated from one or more users' successful usage of respective authentication data and requests for resetting authentication data.

10. The system of claim 1, wherein the probability of the user losing the authentication data is estimated, including considering a frequency or a number of times the user has successfully and legitimately used the authentication data.

11. The system of claim 1, further comprising a means for giving the user a notification before or after changing the procedure for resetting the authentication data.

12. The system of claim 11, wherein the notification includes a secret to authenticate the user in the resetting procedure.

13. The system of claim 1, wherein a user input defining a user-defined procedure is received to override the automatic selection of the procedure.

14. A method for controlling access to user data on a computing system, comprising:
   using, by a processor, authentication data for controlling a user's access to user data;
   selecting a procedure from a set of at least two procedures for resetting the authentication data; and
   activating the selected procedure to reset the authentication data when the authentication data is lost or the user requests a reset of the authentication data,
   where selecting a procedure includes considering at least one of a value of user data or a probability of the user losing the authentication data, the method further comprising:
   automatically selecting a new procedure different from the selected procedure from the set upon determining a change in the value of the user data or a change in the probability of the user losing the authentication data based on one or more predetermined criteria.

15. The method of claim 14, wherein the authentication data includes a password.

16. The method of claim 14, wherein the authentication data includes a secret key.

17. The method of claim 14, wherein the authentication data includes a pair of public and private keys.

18. The system of claim 17, wherein considering the probability of the user losing the authentication data includes estimating the value of the user data or the probability of the user losing the authentication data including considering a frequency or number of times the public key is legitimately retrieved from a central server.

19. The method of claim 14, wherein considering the value of the user includes estimating the value of the user data including considering a monetary value or a size of transaction allowed when the user is authenticated using the authentication data.

20. The method of claim 14, wherein considering the value of the user includes estimating the value of the user data including considering a number of messages or a size of messages, or sensitivity of messages made available to the user once the user is authenticated using the authentication data.

21. The method of claim 14, wherein considering the probability of the user losing the authentication data includes estimating the probability of the user losing the authentication data based on a mathematical model describing decay of human memory with respect to time.

22. The method of claim 21, wherein the mathematical model includes parameters derived from statistical data, wherein the statistical data includes data accumulated from one or more users' successful usage of respective authentication data and requests for resetting the authentication data.

23. The method of claim 14, wherein considering the probability of the user losing the authentication data includes estimating the probability of the user losing the authentication data including considering a frequency or a number of times the user has successfully and legitimately used the authentication data.

24. The method of claim 14, further comprising giving the user a notification before or after changing the procedure for resetting the authentication data.

25. The method of claim 24, wherein the notification includes a secret to authenticate the user in the resetting procedure.

26. The method of claim 14, further comprising storing the authentication data.

27. The method of claim 14, further comprising:
   receiving a user input defining a user-defined procedure; and
   overriding the selected procedure based on the user input.

28. A computer program product tangibly stored on a machine readable medium, the product including instructions operable to cause a processor to:
   store authentication data for controlling a user's access to user data; and
   select a procedure from a set of at least two procedures for resetting the authentication data,
   where at least one of a value of the user data or a probability of the user losing the authentication data is considered in selecting the procedure;
   where the selected procedure is activated to reset the authentication data when the authentication data is lost or the user requests a reset of the authentication data; and
   where the selector automatically selects a new procedure different from the selected procedure from the set upon determining a change in the value of the user data or a change in the probability of the user losing the authentication data based on one or more predetermined criteria.

* * * * *

UNITED STATES PATENT AND TRADEMARK OFFICE
CERTIFICATE OF CORRECTION

| | | |
|---|---|---|
| PATENT NO. | : 8,078,881 B1 | Page 1 of 1 |
| APPLICATION NO. | : 10/988061 | |
| DATED | : December 13, 2011 | |
| INVENTOR(S) | : Gary G. Liu | |

It is certified that error appears in the above-identified patent and that said Letters Patent is hereby corrected as shown below:

On Col. 17, line 32 (Claim 18), delete "The system of" and insert -- The method of -- therefor.

Signed and Sealed this
Tenth Day of July, 2012

David J. Kappos
*Director of the United States Patent and Trademark Office*